Feb. 10, 1953 J. H. BOICEY ET AL 2,628,177
APPARATUS FOR PRESSING CURVED LAMINATED SAFETY GLASS
Filed Oct. 8, 1948 4 Sheets-Sheet 1
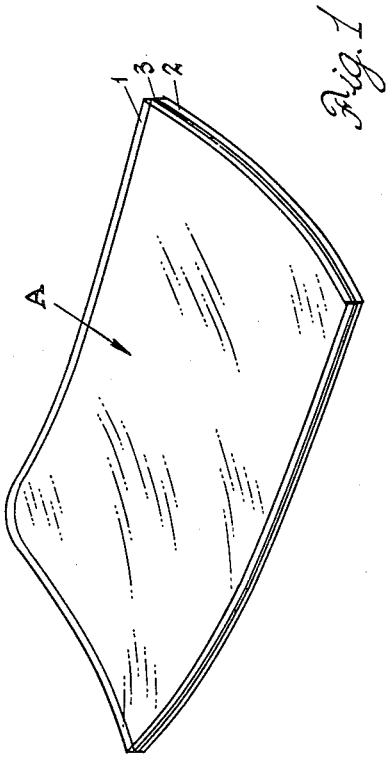
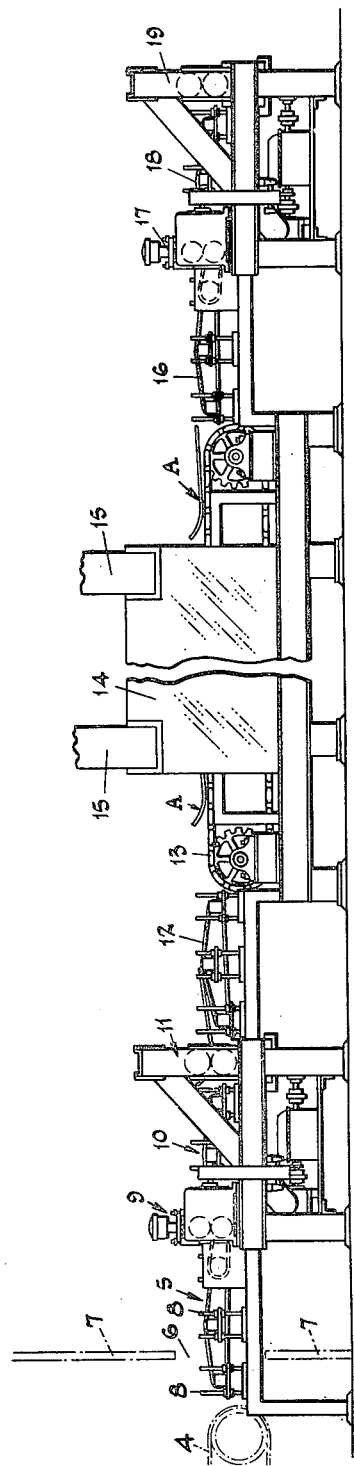
INVENTORS
James H. Boicey and
BY Carl B. Williams, Jr.
Nobbe & Swope
ATTORNEYS

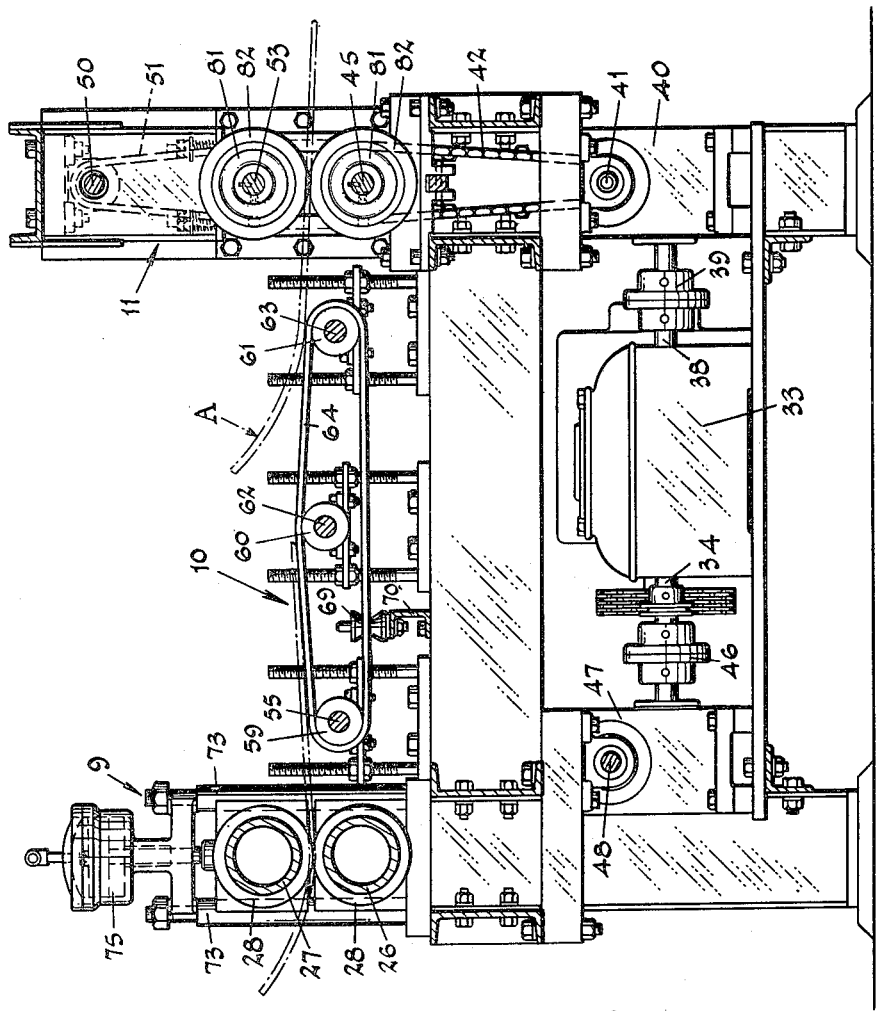
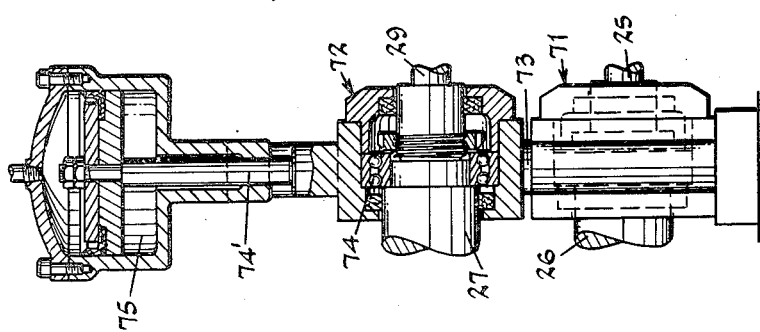

INVENTORS
James H. Boicey and
BY Carl B. Williams, Jr.
Robbe & Swope
ATTORNEYS

Patented Feb. 10, 1953

2,628,177

UNITED STATES PATENT OFFICE 2,628,177

APPARATUS FOR PRESSING CURVED LAMINATED SAFETY GLASS

James H. Boicey and Carl B. Williams, Jr., Toledo, Ohio, assignors to Libbey-Owens-Ford Glass Company, Toledo, Ohio, a corporation of Ohio Application October 8, 1948, Serial No. 53,514

9 Claims. (Cl. 154—2.7)

This invention relates to the manufacture of laminated safety glass and in particular to an improved pressing method and apparatus for use in the compositing of bent glass laminations and plastic interlayers.

Generally speaking, laminated safety glass comprises two or more sheets of glass and one or more sheets of non-brittle plastic material interposed between the sheets of glass and bonded to each of the sheets of glass to form the composite structure. In manufacturing this type of safety glass, it is customary to first assemble the various laminations in proper superimposed relationship, press the assembly to drive out air and moisture from between the various layers, and then bond the layers together by subjecting the assembly to the action of heat and pressure.

According to one method of manufacture an ordinary roll type press, a press having rubber surfaced rolls, similar except for size to an ordinary washing machine wringer, is used to press the various layers of the laminated assembly together.

Such a roll type press is not satisfactory for pressing assemblies of curved sheets of glass in the manufacture of curved safety glass. The difficulty with the ordinary roll type press comes from its inability to accommodate itself to the transverse curvature of the curved sheets of glass being processed.

The principal object of this invention is to provide a special kind of roll type press in which the rollers thereof apply substantial pressure against the surface of a transversely curved glass and plastic sandwich without developing appreciable bending stress in the curved sheets of glass.

Another object of the invention is to provide a roll type press in which certain cooperating rollers are urged toward each other with much greater force than the force required to displace the rollers as a pair, i. e., to move the rollers vertically without varying the separation.

A still further object of the invention is to provide a roll type press in which individual rollers thereof are carried on articulated shafts and that are urged toward the glass being pressed by forces that are generally independent of changes in the position of the axis of the roller.

Still another object is to employ weight operated mechanism for supplying a substantial portion of the force urging the rollers toward the glass being processed.

Another object is to provide a method of prepressing glass-plastic sandwiches including the steps of applying pressure first to a strip along the middle and then to the side area of a moving sandwich, next heating the sandwich, and then again applying pressure first to the middle and then to the edge portions thereof.

An ancilliary object is to provide a conveyor arrangement that is oriented with respect to the rollers of the press so that the leading marginal area of the glass and plastic sandwich is presented to the rollers along the tangent plane common to the rollers.

More specific objects and advantages are apparent from the following description of a preferred form of the invention.

According to the invention, sandwiches formed of curved sheets of glass and plastic interlayers are first passed through a roller press section having relatively narrow rollers which firmly press a central area extending along the longitudinal center line of the glass and plastic sandwich. The rollers are faced with a resilient material, such as rubber, so that they may accommodate, without deflection of the supporting shafts, the transverse curvature present in the center strip of the glass passing between the rollers. This first set of rollers thus serve to drive any air entrapped between the glass layers from the center area toward the marginal areas of the glass. After leaving the rollers of the first roller section, the glass laminate assembly is caught on an upwardly inclined portion of a conveyor, carried over a hump in the conveyor and downwardly toward the next roller section. The angle of inclination is adjusted according to the longitudinal curvature of the glass so that the marginal area along the leading edge may enter between the succeeding rollers without bending the glass sheet or lifting it from the conveyor.

Succeeding roller press sections include rollers carried on fixed axes for guiding the glass sandwich and pressing those areas immediately adjacent and overlapping the previously pressed center strip, and other sets of rollers carried on articulated shafts, and arranged to press the remaining areas of the glass laminate assembly. The lower ones of the articulated shafts are preferably urged upwardly by weight operated lever assemblies constructed so that the upwardly exerted force against the upper rollers is generally independent of their elevation. The upper articulated shafts, carrying cooperating rollers, are urged downwardly by their own weight plus the force of relatively long low-rate springs arranged to urge these rollers downwardly. By using springs of relatively low rate the downwardly directed force of the upper rollers carried on the articulated shafts is substantially independent of the elevation of the shafts or their separation. Preferably the articulated shafts are connected to and driven by the shafts carrying the guiding rollers and are connected thereto through some form of universal joint. The outer ends of the articulated shafts are journaled in bearings that are slidably mounted in vertical guides and to which the weight operated levers and the springs are connected for transmitting force to the rollers.

This particular arrangement for supplying force to the articulated shafts is preferred over linkages or hydraulic systems that attempt to connect the shafts together so that they move simultaneously in accommodating the transverse curvature of the glass sheets being pressed. The linkage arrangements that were considered for urging the articulated shafts toward each other to supply the pressing pressure without tending to bend the glass out of its original transverse curvature were, in general, unsatisfactory because of their complexity and difficulty of adjustment. In the preferred form, the weight of the upper ones of each set of rollers is utilized as part of the pressing force whereas the weight of the lower ones, being counterbalanced by weight operated means, is offset without applying bending forces to the glass.

In the preferred form, the guiding rollers and the rollers on the articulated shafts are faced with a thick layer of a resilient material so that they may accommodate, without excessive localized pressure, the transverse curvature of the glass occurring within the width of one of the rollers.

A preferred form of the invention is illustrated in the accompanying drawings.

In the drawings:

Figure 1 is a perspective view of an assembled glass-plastic sandwich in which the sheets of glass are curved transversely as well as longitudinally;

Figure 2 is a side elevation of the glass pressing apparatus including several roller press sections and conveyors for carrying the glass through the apparatus;

Figure 5 is an enlarged vertical longitudinal section taken substantially along the line 5—5 of Figure 4;

Figure 6 is a fragmentary transverse section taken along the line 6—6 of Figure 3;

Figure 3:
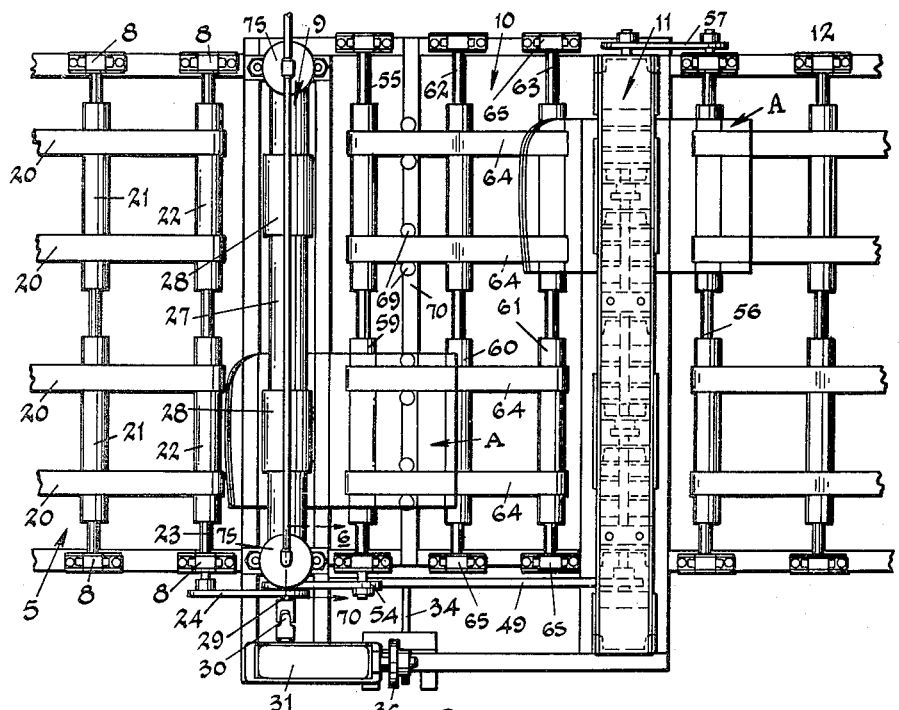
Figure 3 is a fragmentary plan view of a section of the apparatus including portions of conveyors and two roller press sections.

These specific figures and accompanying description are intended merely to illustrate the invention and not to impose limitations on the claims.

In the manufacture of curved laminated safety glass, flat glass sheets are first cut according to a pattern and are then carried on molds through a heated furnace within which the glass is heated to softening temperatures and allowed to sag until it conforms to the shaping surface of the mold. In order that the optical quality of the glass is not impaired during the bending process, the molds are arranged to contact only the marginal area of the glass. The glass sheets for each piece of safety glass are carried through the furnace at the same time on the same mold so that when they are bent they exactly conform to each other even though they may depart slightly from the intended curvature. Such departure from intended curvature does not materially effect the quality of the finished bent glass inasmuch as the glass is mounted from its marginal area only and the shape of such marginal area is precisely determined by the shaping surface of the mold. However, it is highly important that the glass sheets for a single laminated sheet be bent in sets and that the sets be kept together throughout the remaining processing operations since it is practically impossible to select bent pieces of glass from various sets and make a satisfactory laminated curved glass window. This follows because, even though the marginal areas of separately bent sheets are exact in form, the central areas have small uncontrolled variations in curvature which, though small, are sufficient to prevent bonding between the plastic interlayer and the adjacent surfaces of the glass.

After the glass has been bent, it is carefully washed and dried and then assembled with a plastic interlayer interposed or sandwiched between the sheets of bent glass. Such an assembly, generally indicated by the letter A and consisting of an upper sheet of bent glass 1 and a lower sheet 2 separated by a plastic interlayer 3, is illustrated in Figure 1.

Before such a sandwich is subjected to the heat and pressure that bonds the plastic interlayer 3 to the adjacent surfaces of the glass sheets 1 and 2, it is necessary as a preliminary operation to press the glass sheets tightly together to expel any air or moisture from the space between them. Next, the sandwich is subjected to moderate heat sufficient to slightly soften the plastic interlayer and it is then pressed a second time to secure intimate contact between all portions of the plastic interlayer and the adjacent surfaces of the glass sheets. Following the second pressing operation, which also serves to seal the edges of the sandwich, the laminated assemblies are placed in an autoclave where they are subjected to sufficient heat and pressure to securely bond the plastic interlayer to the adjacent glass surfaces. The preliminary pressing operations are necessary to make sure that the glass and plastic interlayers are in sufficiently close contact that the liquid in the autoclave will not penetrate between the layers of glass and thus interfere with the bonding of the plastic interlayer to the glass.

The apparatus for performing the preliminary pressing operations is illustrated generally in Figure 2. After the glass sheets 1 and 2 have been washed and dried in an air conditioned room, they are assembled with the plastic interlayer 3, to the form shown in Figure 1 as it is carried along on an assembly room conveyor 4. At the end of the air conditioned assembly room the glass assemblies A are transferred from the conveyor 4 to a first conveyor 5 that extends through a window 6 in an end wall 7 of the air conditioned room. The conveyor 5 is carried on adjustable standards 8 of which the central standard is higher than the end standards so that the first portion of this conveyor ascends at a small angle and the second portion descends as it approaches a first roller press section 9. The angle of descent of the second portion of the conveyor 5 is selected according to the longitudinal curvature of the glass being processed so that the leading marginal area of the glass enters the roller press 9 along a tangent plane common to the rollers. If the longitudinal curvature of the glass sheets varies materially from end to end, that end having the least curvature is first started through the roller press 9 so as to minimize the slope required in the conveyor to properly present the glass to the rollers.

As the glass and plastic sandwich or assembly A emerges from the roller press 9, which presses a central area only, the glass is caught on a second conveyor 10 which, like the conveyor 5, has inclined portions first ascending and then descending. The ascending portion of the conveyor 10 catches the assembly A as it leaves the roller press section 9 and the conveyor carries it forward and then downward to present it to a second roller press section 11. The roller press 11 includes rollers carried on articulated shafts arranged to follow the transverse curvature of the side areas of the glass sheets as the laminated glass assembly passes therebetween.

As the glass and plastic assembly emerges from the second roller press section 11, it is caught on an ascending portion of a third conveyor 12 which carries the glass forward to a chain conveyor 13 leading through an oven 14. The oven 14 is supplied with heated air through ducts 15 and is maintained at a temperature such that the plastic interlayers in the glass and plastic assembly become slightly tacky and plastic thereby enabling a subsequent pressing operation to effect intimate contact between the plastic interlayer 3 and the adjacent surfaces of the glass sheets 1 and 2.

Upon emerging from the oven 14 the glass assemblies are transferred from the chain conveyor 13 to a fourth conveyor 16 leading to a third roller press section 17 that is similar to the first roller press section 9. From the roller press section 17 the glass is carried by a fifth conveyor 18 to a fourth roller press section 19 corresponding in construction and function to the second press section 11. The roller presses 17 and 19 acting on the heated glass produce such intimate contact between the plastic interlayer and the adjacent surfaces of the glass sheets as to prevent separation of the glass layers when processed in the autoclave.

In the operation of the structure, the roller press section 9 serves to press the strip along the center part of each sandwich thereby driving the entrapped air and moisture toward the edges of the sandwich. The next roller press section 11 acts on the remaining area of the glass and by holding the edges of the center areas compressed during the pressing of the side edges drives entrapped air and moisture from between the glass sheets rather than allowing it to creep back into the central area. The roller press section 11 as constructed according to the invention is capable of supplying a relatively large compressive force against the surfaces of the glass assembly while conforming to the transverse curvature of the glass. Thus, the glass sandwich elements are pressed into intimate contact throughout the entire area without danger of breakage. The same result follows in the roller press sections 17 and 19 which act on the laminated glass structure after it has been heated in the oven 14.

Various details in the construction of the improved roller press are illustrated in Figures 3 to 9. Referring now to Figure 3, the first conveyor 5, representative of the conveyors 5, 10, 12, 16 and 18, comprises a plurality of belts 20 that are carried over rollers 21 mounted on shafts journaled in the adjustable standards 8. The belts 20 are driven by rollers 22 mounted on a shaft 23 which in turn is driven by a belt 24 from a shaft 25 carrying lower rollers 26 (see Figure 5) of the roller press 9.

The roller presses and conveyors are wide enough to accommodate two parallel lines of laminated glass assemblies and therefore the lower roller 26 and cooperating upper roller 27 each carry a pair of rubber treads 28 arranged to contact the central area of the glass assemblies as they pass between the rollers.

The shafts 25 and 29, respectively, for the rollers 26 and 27 are driven through universal joints 30 from a gear transmission 31 erected at one side of the conveyor and press structure.

Power for driving the roller press sections 9 and 11 as well as the conveyors 5, 10 and 12 is supplied from an electric motor 32 that is belt connected to a speed reducer 33. The output shaft 34 of the speed reducer 33 is connected through a chain and sprocket drive 34 to drive a short idler shaft 35. A second chain 36 driven by the idler shaft 35 is trained over and drives a sprocket 37 carried on the input shaft of the gear transmission 31.

Figure 7:
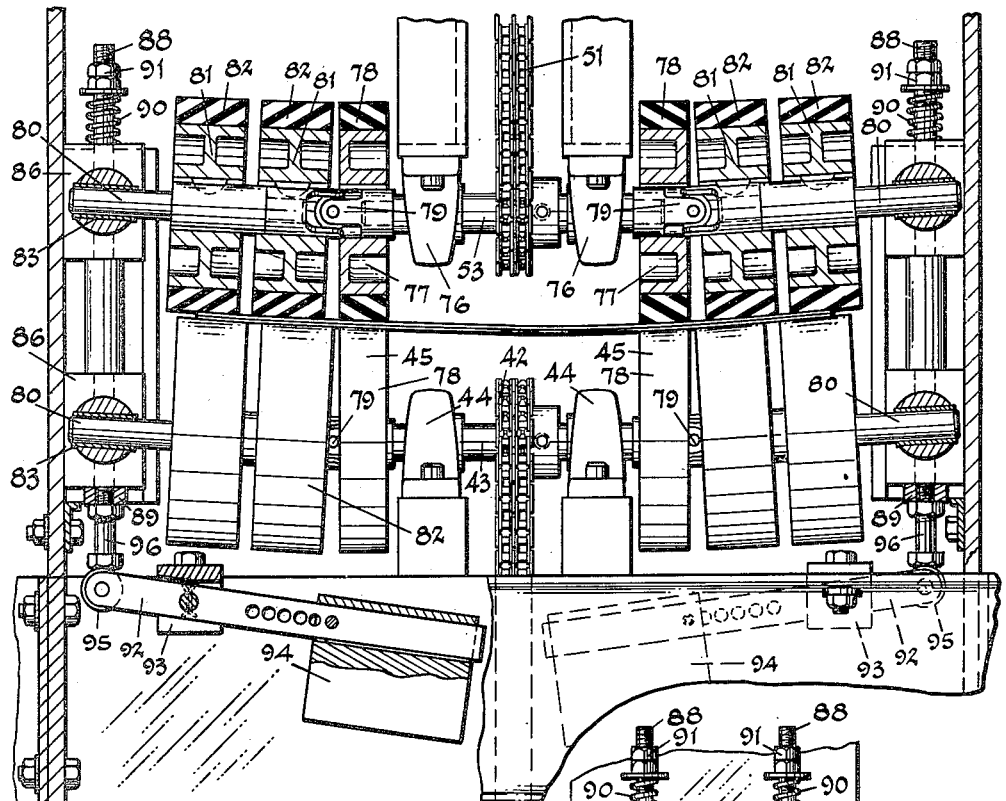
Figure 7 is an enlarged transverse section of one side of the conveyor showing cooperating rollers carried on articulated shafts.

The output of the speed reducer 33 also drives through an output shaft 38 and coupling 39 into a second speed reducer 40 having laterally extending drive shafts 41. The drive shafts 41 are connected through chains 42 to drive lower shafts 43 of the second or fourth roller press sections 11 or 19. (Since these press sections are identical in structure, the description of one will suffice for both.) As best shown in Figs. 3, 5 and 7, the shafts 43 of the press sections are journaled in bearings 44 and carry press rollers 45 arranged to contact those areas of the glass overlapping and immediately adjacent the central strip or area that is pressed between the resilient collars 28 of the first rollers 26 and 27.

Figure 4:
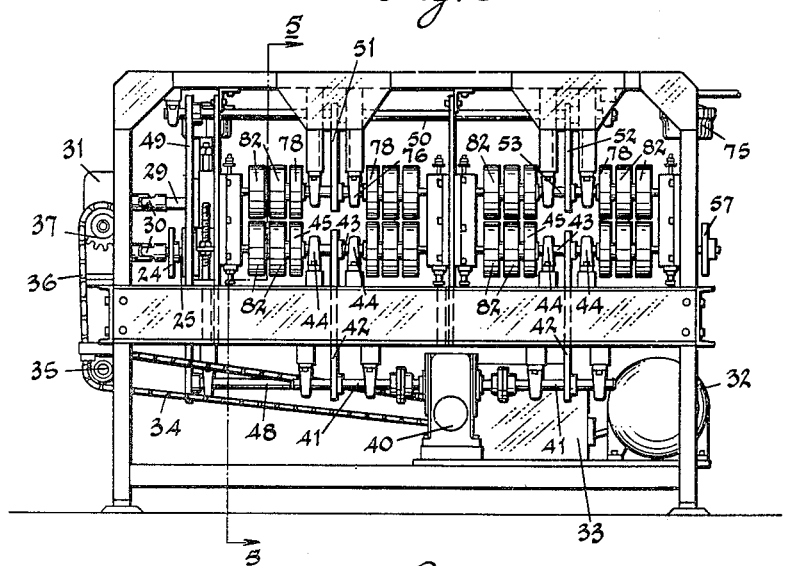
Figure 4 is an end elevation of one of the improved roller press sections as seen from the right end of Figure 2.

The speed reducer 33 (Fig. 5) also drives, through the output shaft 34, and coupling 46, to a right angle drive 47 having an output shaft 48 (Figures 4 and 5). The shaft 48 is connected through a chain 49 (Figure 4) to an overhead shaft 50 which in turn is connected through chains 51 and 52 to upper roller shafts 53 of the second or fourth roller press sections 11 or 19.

The motor 31, in addition, by way of the gear drive 31 and a belt 54 (Figure 3) drives a shaft 55 of the conveyor 10. Furthermore, the conveyor 12 has its drive shaft 56 driven through a belt 57 from an articulated shaft 58 connected to one of the lower roller shafts 43. In this manner the motor 32 is arranged to drive both of the roller press sections and the conveyors so as to maintain exact synchronism between these mechanisms and thus secure reliable operation of the presses.

Referring to Figures 3 and 4, the conveyor 10, the construction of which is representative of the others, includes the drive roller 59 on the drive shaft 55 and idler rollers 60 and 61 on shafts 62 and 63, over which conveyor belts 64 are trained. The bearings 65 in which the shafts 55, 62 and 63 are journaled are carried by plates 66 which are mounted for vertical adjustment on threaded posts 67 by means of nuts 68. In this way the rollers 59, 60 and 61, and consequently the belts 64, can be adjusted to the desired position to receive a sandwich from the pressing rolls 26 and 27 and to deliver it to the pressing rollers of the roller press section 11. Moreover, the angle of descent of the discharge half of the conveyor can be selected and maintained according to the longitudinal curvature of the glass being processed so that the leading marginal edge of the sandwich will enter the roller press section 11 along a tangent plane common to the rollers thereof.

A plurality of guides 69 are mounted on a cross member 70 of the frame of the conveyor to guide the lower flight of the belts 64 and hold them in proper relationship with respect to each other. In addition to or in lieu of the guides 69, the drive roller 55 may be enlarged or crowned in the vicinity of the center lines of each of the belts. This has the same effect as crowning a belt pulley to keep the belt centered on the pulley.

Referring now to Figures 5 and 6, the shaft 25 driving the lower roller 26 of the roller press section 11 and the corresponding shaft 29 for the upper roller 27 are shown journaled in bearing assemblies 71 and 72 respectively mounted between pairs of uprights 73. The lower bearing assemblies 71 rest on the frame of the machine and are thus held securely in place. The upper bearing assemblies 72 which are substantially identical with the lower bearing assemblies 71 and similarly serve as housings for double row ball bearings 74 are slidably mounted between the uprights 73 and are urged downwardly by piston rods 74' of interconnected pneumatic cylinders 75 one at each end of the roller press section 9. The magnitude of the downward pressure is controlled by the pressure of the fluid admitted into the pneumatic cylinders 75. The pneumatic cylinders 75 preferably have a fairly large volume so that appreciable movement of the bearings 72 may take place without substantial change in the pressure within the cylinders and consequently without substantial change in the force exerted against the glass being pressed.

The control for the pneumatic cylinders 75 may consist of a pressure regulator connected to a source of high pressure air and arranged to feed air into the cylinders at a prescribed pressure. A small escape hole is provided from one of the cylinders or from the piping to them so that the pressure cannot build up in the cylinders should there be a slight leak through the pressure regulator. Alternatively a pressure relief valve may be connected to discharge air from the pneumatic cylinders 75 should the pressure therein exceed the setting of the first pressure regulator.

Figure 9:
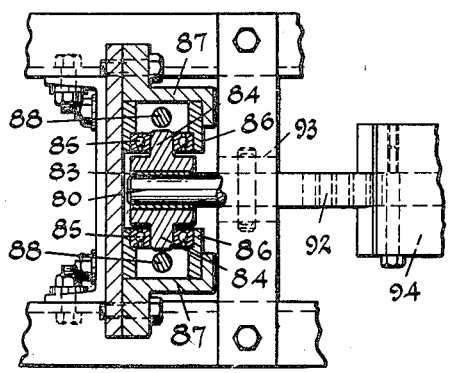
Figure 9 is a fragmentary plan view showing the detail construction of one of the shaft bearings.
Figure 8:
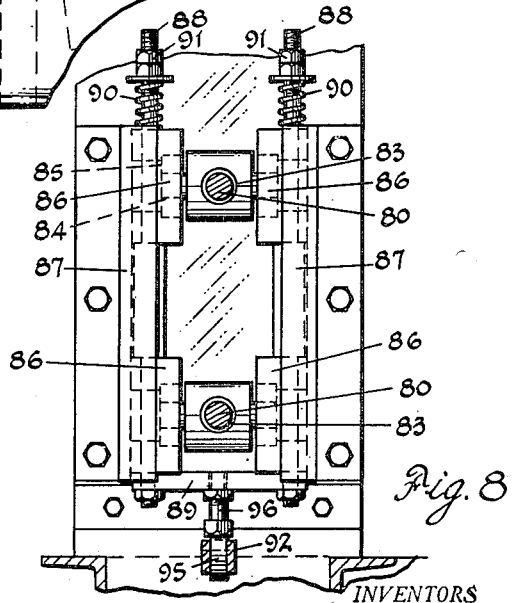
Figure 8 is a fragmentary detail showing the mounting arrangement for the bearings carrying the free ends of the articulated shafts.

Figures 7, 8 and 9 illustrate constructional details of the second and fourth roller press sections 11 and 19. Referring now to Figure 7 in particular, the lower shaft 43 and upper shaft 53 are journaled in rigid bearings 44 and 76 and are held parallel to each other. The outer ends of these shafts carry rollers 45 and 77 respectively. Each of these rollers carries a rubber tire 78, the rubber being sufficiently pliable in relation to the axial length of the tire so that it can accommodate the transverse curvature and slope of the glass occurring within its axial length. Thus, the cooperation of these rollers, 45 and 77, two on the ends of the lower shaft 43 and two on the ends of the upper shaft 53, both press and guide the glass laminate assembly A during its passage through the second or fourth roller press section. The resiliency of the rubber tires 78 in accommodating differences in thickness of the glass laminate assemblies makes it possible to fixedly mount the bearings 44 and 76 for the shafts 43 and 53 and thus simplify the construction of the press.

Each end of each of the shafts 43 and 53 by means of universal joints 79 drives an articulated shaft 80 carrying rollers 81 each of which is equipped with a rubber tire 82. The free ends of the shafts 80 are journaled in sleeve bearings 83 which bearings are in the form of a collar having laterally directed trunnions 84. The trunnions 84 are carried in ball bearings 85 (Figure 9) which in turn are mounted in carriers 86. The carriers 86, one for each of the sleeve bearing trunnions 84, are mounted in vertical guideways 87 so that they may move vertically to accommodate the up and down movement of the ends of the articulated shafts 80 as the shafts follow the changes in transverse curvature of the glass laminate assemblies being processed. The carriers 86 including the bearings 83 are arranged in sets one above the other to correspond to the location of the roller carrying articulated shafts 80.

In order that the rollers may exert pressure against the glass the carriers 86 of each pair are resiliently connected together. As illustrated in the drawings, the carriers 86 are connected by long bolts 88 which at their lower ends are secured to a cross-piece 89 upon which the lower carriers rest. The bolts 88 extend upwardly through the lower and upper carriers 86 and at their upper ends carry compression springs 90 held compressed between the upper surfaces of the upper ones of the carriers 86 and nuts 91 screwed onto the upper ends of the bolts 88. This resiliently connected assembly of lower and upper carriers supporting the bearings 85 that journal the ends of the articulated shafts 80 urges the shafts toward each other with a force depending upon the compression and strength of the springs 90. Since this whole assembly is free to rise and fall in the guideways 87, it follows that the pressure exerted is independent of the vertical position of the carriers 86.

The weight of the bearing carriers 86, the bearings carried therein, and the ends of the articulated shafts 80 carrying the rollers 81, if unsupported, would exert a large bending moment on the glass being processed. To overcome this, the cross-piece 89 supporting the lower ones of the carriers 86 is urged upwardly by a lever 92 which, fulcrumed from a bracket 93 of the frame of the apparatus, carries on one arm a heavy counterweight 94 and at its other end a roller 95 that contacts the lower end of a bolt 96 extending downwardly from the cross-piece 89.

The weight of the counterweight 94 and the ratio of the lever 92 is selected so that the upwardly directed force exerted through the bolt 96 against the lower cross-piece 89 balances the weight of the assembly including the carriers 86, bearings 83 and articulated shafts 80 carrying the rollers 81. This places the assembly in approximately neutral equilibrium and as a result the articulated shafts 80 float up and down with little restriction as they accommodate themselves to the transverse curvature of the glass sheets being pressed.

This arrangement represents a simple effective structure for applying a relatively large rolling pressure against the outer faces of a laminated assembly of curved glass sheets without subjecting the glass to a substantial bending moment. In this structure the pressure exerted is the sum of the force supplied by the springs 90 plus the weight of the upper ones of the rollers 81. This force is practically independent of the angular position of the shafts 80 and thus the glass laminate assembly is subjected to the desired pressing pressures regardless of the amount of transverse curvature. Whether the springs 90 act between the upper ones of the carriers 86 and bolts 88 extending up from the lower ones of the carriers 86 or whether they act between the upper carriers 86 and relatively fixed points is immaterial as long as the force exerted by the springs does not change appreciably throughout the normal vertical excursions of the carriers 86. Likewise, since the springs 90 contribute only the excess of force required beyond that of the weight of the upper rollers 81 it follows that the springs 90 may be eliminated if the weight of the upper ones of the carriers 86 plus the rollers 81 and any additional mass attached thereto is sufficient to supply the downward force required from the upper rollers 81. In any event the rollers are urged toward each other by forces that are substantially independent of the vertical position of the rollers.

Various modifications may be made in the details of construction and the method of applying force to the rollers carried on the articulated shafts without departing from the spirit and scope of the invention.

Having described the invention, we claim:

1. In apparatus for pressing a curved laminated glass assembly, in combination, a first set of rollers for applying force to the outside faces of the laminated assembly along a central strip thereof as the glass passes between the rollers, and a second set of rollers that include opposed guided roller elements acting along the edges of the strip pressed by the first set of rollers and other opposed roller elements acting between the guided rollers and the marginal area of the glass, means for mounting said last-mentioned roller elements for movement toward and away from one another and for tilting movement relative to said guided roller elements, and means for yieldably urging said last mentioned roller elements toward each other whereby the rollers conform to the transverse curvature of the glass and apply pressure thereto without stressing the glass in bending.

2. In apparatus for pressing a curved laminated glass assembly, in combination, a first set of rollers for applying compressing force along a central strip of the laminated assembly as the assembly passes between the rollers, and a second set of rollers for applying compressing force to the area extending from the central strip to the edges of the glass assembly, said second set of rollers including separate opposed roller elements, separate shafts for carrying said separate roller elements, and means for connecting adjacent ends of shafts for universal movement relative to one another, whereby the roller axes may move to conform to the transverse curvature of the glass while the rollers apply force to the glass.

3. In apparatus for pressing a curved laminated glass assembly, in combination, a first set of rollers for applying compressing force along a central strip of the laminated assembly as the assembly passes between the rollers, and a second set of rollers for applying compressing force to the area between the central strip and the edge of the glass, said second set of rollers including one pair of opposed roller elements for positioning the glass, and other opposed roller elements for applying substantially constant pressure to the transversely curved portion of the glass assembly, shafts for said pair of opposed roller elements, means for mounting said shafts for rotation on fixed axes, shafts for said other opposed roller elements, and means connecting the adjacent ends of said first mentioned shafts to the adjacent ends of said second mentioned shafts for universal movement relative to one another.

4. In apparatus for pressing a curved laminated glass assembly, in combination, a first set of rollers for applying compressing force along a central strip of the laminated assembly as the assembly passes between the rollers, a second set of rollers for applying compressing force to the area between the central strip and the edge of the glass, said second set of rollers including a first pair of roller elements carried on first shafts, means for mounting said first shafts with their axes rigidly held in alignment, and at least one other pair of roller elements carried on shafts, means for supporting and driving one end of said second mentioned shafts by the first shafts, and means for yieldably supporting the other ends of said second mentioned shafts for movement toward or away from the surface of the glass assembly.

5. In apparatus for pressing a curved laminated glass assembly, in combination, a first set of rollers for applying compressing force along a central strip of the laminated assembly as the assembly passes between the rollers, a second set of rollers for applying compressing force to the remaining area of the glass assembly, the second set of rollers comprising two pairs of spaced apart roller elements carried on aligned shafts for pressing a portion of said remaining area and holding the laminated glass assembly from tipping, and other rollers carried on separate shafts, and means connecting adjacent ends of said aligned shafts and said separate shafts for universal movement relative to one another whereby said separate shafts can be driven from the aligned shafts for pressing the remaining area of the laminated glass assembly.

6. In apparatus for pressing a curved laminated glass assembly, in combination, a first set of rollers for applying compressing force along a central strip of the laminated assembly as the assembly passes between the rollers, other rollers for subsequently applying compressing force to the remaining area of the glass laminate, said other rollers including separate opposed roller elements, separate shafts on which said opposed roller elements are carried, means for connecting adjacent ends of said separate shafts for universal movement relative to one another, means for mounting said connected shafts for vertical movement, counterweights for supporting the weight of the connected shafts, and means for resiliently urging the opposed shafts toward each other to control the force applied by the rollers.

7. In apparatus for pressing a curved laminated glass assembly, in combination, a generally horizontal conveyor that is divided into sections, sets of opposed rollers for applying compressive forces to the laminate assembly located between the conveyor sections, each of said conveyor sections that lies between two sets of rollers having an upwardly inclined portion leading from the rollers of one set and a downwardly inclined portion leading to the rollers of the other set of rollers whereby the glass assembly having curvature in its direction of travel presents its leading marginal area substantially in a tangent plane common to the rollers as it enters the space between said last mentioned rollers.

8. In apparatus for pressing a curved laminated glass assembly, in combination, a plurality of sets of opposed rollers for applying pressure to the surfaces of the glass assembly, a belt conveyor extending between sets of rollers, and individually adjustable stands for supporting the conveyor along its length, said stands being adjusted so that the portion of the conveyor adjacent each set of rollers is inclined toward a higher point intermediate said sets of rollers whereby to present the leading marginal area of the curved glass assembly generally in a tangent plane common to the rollers as the glass assembly enters the space between the rollers.

9. In apparatus for pressing a curved glass-plastic sandwich, a conveyor for moving the sandwiches along a definite predetermined path, oppositely disposed pressure rolls arranged in the path of travel of the sandwich to engage opposite surfaces thereof, means mounting said rolls for floating movement of a portion thereof as a unit to conform to the curvature of the sandwich, and means for independently urging said opposed rolls toward one another while moving as a unit to press the sandwich therebetween.

JAMES H. BOICEY.
CARL B. WILLIAMS, Jr.

REFERENCES CITED

The following references are of record in the file of this patent:

UNITED STATES PATENTS

| Number | Name | Date |
| --- | --- | --- |
| 309,082 | Munten | Dec. 9, 1884 |
| 909,833 | Vrooman | Jan. 12, 1909 |
| 990,903 | Reese | Apr. 25, 1911 |
| 1,190,698 | Abramsen | July 11, 1916 |
| 1,748,080 | Schreiner | Feb. 25, 1930 |
| 1,897,862 | Randall | Feb. 14, 1933 |
| 1,939,639 | Schafer | Nov. 7, 1933 |
| 1,992,976 | Watkins | Mar. 5, 1935 |
| 2,025,115 | Lytle | Dec. 24, 1935 |
| 2,028,928 | Sherts | Jan. 28, 1936 |
| 2,054,864 | Owen | Sept. 22, 1936 |
| 2,068,104 | Haux | Jan. 19, 1937 |
| 2,202,670 | Owen | May 28, 1940 |
| 2,525,980 | Walters | Oct. 17, 1950 |

FOREIGN PATENTS

| Number | Country | Date |
| --- | --- | --- |
| 277,903 | Germany | Oct. 14, 1913 |
| 296,512 | Italy | May 18, 1932 |